United States Patent
Noell

(10) Patent No.: US 11,928,851 B2
(45) Date of Patent: Mar. 12, 2024

(54) COMPUTER-IMPLEMENTED METHOD, COMPUTER PROGRAM, DATA PROCESSING SYSTEM AND DEVICE FOR DETERMINING THE REFLECTANCE BEHAVIOR OF A SURFACE OF AN OBJECT, AND STORAGE MEDIUM WITH INSTRUCTIONS STORED THEREON FOR DETERMINING THE REFLECTANCE BEHAVIOR OF A SURFACE OF AN OBJECT

(71) Applicant: Carl Zeiss Vision International GmbH, Aalen (DE)

(72) Inventor: Tobias Noell, Kaiserslautern (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/366,769

(22) Filed: Aug. 8, 2023

(65) Prior Publication Data
US 2023/0386172 A1 Nov. 30, 2023

Related U.S. Application Data

(63) Continuation of application No. PCT/EP2023/053625, filed on Feb. 14, 2023.

(30) Foreign Application Priority Data

Feb. 23, 2022 (EP) ..................................... 22158278

(51) Int. Cl.
*G06V 10/60* (2022.01)
*G06T 7/62* (2017.01)
(Continued)

(52) U.S. Cl.
CPC ................ *G06V 10/60* (2022.01); *G06T 5/70* (2024.01); *G06T 7/62* (2017.01); *G06T 7/80* (2017.01); *G06V 10/44* (2022.01); *G06V 10/761* (2022.01)

(58) Field of Classification Search
CPC ...... G06V 10/60; G06V 10/44; G06V 10/761; G06T 5/002; G06T 7/62; G06T 7/80;
(Continued)

(56) References Cited

U.S. PATENT DOCUMENTS

| | | | | |
|---|---|---|---|---|
| 2011/0007269 A1* | 1/2011 | Trumm | ................ | G02C 13/005 351/204 |
| 2014/0055570 A1* | 2/2014 | Dehais | .................... | G06T 17/10 348/47 |

(Continued)

FOREIGN PATENT DOCUMENTS

| | | | | |
|---|---|---|---|---|
| DE | 102008046988 A1 * | 4/2010 | ............. | G01N 21/55 |
| DE | 102015209487 A1 * | 7/2015 | ........... | G01N 21/274 |
| WO | WO-2017199691 A1 * | 11/2017 | ......... | G01N 21/4738 |

OTHER PUBLICATIONS

Rusinkiewicz, Szymon M. "A New Change of Variables for Efficient BRDF Representation," Stanford University, Eurographics Workshop in Rendering, available at https://www.cs.princeton.edu/~smr/papers/brdf_change_of_variables/, 1998 (last accessed Aug. 8, 2023).

(Continued)

*Primary Examiner* — Jose L Couso
(74) *Attorney, Agent, or Firm* — Tautz & Schuhmacher LLC; Georg Hasselmann

(57) ABSTRACT

A method for determining the reflectance behavior of a surface of an object includes: providing a plurality of images of the object which differ in terms of a recording direction and/or in terms of an illumination direction during the recording; creating data sets with entries which each (Continued)

describe a reflectance value derived from the images and an assigned recording direction and an assigned illumination direction, with each data set being assigned to a point on the surface of the object; and determining missing entries in the data sets on the basis of entries of already created data sets.

17 Claims, 2 Drawing Sheets

(51) Int. Cl.
    *G06T 7/80*           (2017.01)
    *G06V 10/44*         (2022.01)
    *G06V 10/74*         (2022.01)

(58) Field of Classification Search
CPC ............... G06T 15/04; G06T 17/10; G06T 2207/10021; G06T 2207/10024; G06T 2215/16; G06T 7/593; G02C 13/005; G02C 7/027; G02C 13/003; G02C 2202/06; G02C 7/024; G02C 7/10; G01B 11/25; G01B 11/30; G02B 1/11; A61B 3/0008; A61B 3/11; A61B 3/111; A61B 3/14; H04N 13/239; G01N 21/55
See application file for complete search history.

(56) References Cited

U.S. PATENT DOCUMENTS

| | | |
|---|---|---|
| 2014/0268160 A1 | 9/2014 | Debevec et al. |
| 2015/0049306 A1* | 2/2015 | Haddadi ............ A61B 3/0008 351/246 |
| 2016/0275720 A1 | 9/2016 | Dehais et al. |

OTHER PUBLICATIONS

Weyrich, Tim et al. "Principles of appearance acquisition and representation," SIGGRAPH 2008 Class Notes, 1077952576-1077952576, pp. 1 to 119, Aug. 11, 2008.
Audet, Samuel et al. "A user-friendly method to geometrically calibrate projector-camera systems," Computer Vision and Pattern Recognition Workshops, 2009, CVPR Workshops 2009. IEEE Computer Society Conference on IEEE, Piscataway, NJ, USA, pp. 47 to 54, ISBN: 978-1-4244-3994-2, Jun. 20, 2009.
Tunwattanapong, Borom et al. "Acquiring reflectance and shape from continuous spherical harmonic illumination," ACM Transactions on Graphics, vol. 32, No. 4, pp. 1 to 12, Jul. 21, 2013.
Weinmann, Michael et al. "Advances in geometry and reflectance acquisition (course notes)," Nov. 2, 2015; 1077952576-1077952576, pp. 1 to 71, Nov. 2, 2015.
Nielsen, Jannik Bol "On Practical Sampling of Bidirectional Reflectance," PhD Thesis, Jan. 1, 2016.
Giljoo Nam, Joo Ho Lee, Diego Gutierrez, and Min H. Kim "Practical SVBRDF acquisition of 3D objects with unstructured flash photography," ACM Trans. Graph. vol. 37, issue 6, Article 267, Dec. 2018.
Extended European Search Report issued in EP 22 15 8278, to which this application claims priority, dated Jul. 25, 2022, and English-language translation thereof.
Extended European Search Report issued in EP 22 15 8278, to which this application claims priority, dated Sep. 26, 2022, and English-language translation thereof.
International Search Report and Written Opinion issued in PCT/EP2023/053625, to which this application claims priority, dated Apr. 11, 2023, and English-language translation thereof.
Nicodemus, Fred R. "Directional reflectance and emissivity of an opaque surface," Applied Optics, vol. 4, issue 7, pp. 767 to 773, Jul. 1, 1965.
Yu, Yizhou et al. "Inverse global illumination: Recovering reflectance models of real scenes from photographs," Proceedings of the 26th annual conference on Computer graphics and interactive techniques, ACM Press/Addison-Wesley-Publishing Co. pp. 215 to 224, Jul. 1, 1999.
Georghidiades, Athinodoros S., "Recovering 3-D shape and reflectance from a small number of photographs," Proceedings of the 14th Eurographics workshop on Rendering. Eurographics Association, pp. 230 to 240, Jun. 25, 2003.
Lensch, Hendrick et al. "Image-based reconstruction of spatial appearance and geometric detail," ACM Transactions on Graphics (TOG) vol. 22, issue 2, pp. 234 to 257, Apr. 1, 2003.
Goldmann, Dan et al. "Shape and spatially-varying brdfs from photometric stereo," IEEE Transactions on Pattern Analysis and Machine Intelligence, vol. 32, issue 6, pp. 1060 to 1071, Jun. 1, 2010.
Holroyd, Michael et al. "A coaxial optical scanner for synchronous acquisition of 3D geometry and surface reflectance," ACM Transactions on Graphics (TOG), vol. 29, issue 4, p. 99, Jul. 26, 2010.

* cited by examiner

COMPUTER-IMPLEMENTED METHOD, COMPUTER PROGRAM, DATA PROCESSING SYSTEM AND DEVICE FOR DETERMINING THE REFLECTANCE BEHAVIOR OF A SURFACE OF AN OBJECT, AND STORAGE MEDIUM WITH INSTRUCTIONS STORED THEREON FOR DETERMINING THE REFLECTANCE BEHAVIOR OF A SURFACE OF AN OBJECT

CROSS REFERENCE TO RELATED APPLICATIONS

This application is a continuation application of International patent application PCT/EP2023/53628, filed on Feb. 14, 2023 and designating the US, which claims priority to European patent application EP 22 158 278.6, filed on Feb. 23, 2022, both of which are hereby incorporated by reference in their entireties.

TECHNICAL FIELD

The present disclosure relates to a computer-implemented method, a computer program, a data processing system and a device for determining the reflectance behavior of a surface of an object (in particular a spectacle lens, a spectacle frame or a pair of spectacles), and to a non-volatile computer-readable storage medium with instructions stored thereon for determining the reflectance behavior of a surface of an object (in particular a spectacle lens, a spectacle frame or a pair of spectacles).

BACKGROUND

The visual appearance of surfaces is largely determined by how incident light interacts with this surface. For example, possible interactions include diffuse scattering (in the case of rough surfaces), directed radiation (in the case of reflective surfaces) or penetration (in the case of transparent surfaces).

For opaque surfaces, this interaction or reflection behavior can be described mathematically using a bidirectional reflectance distribution function (BRDF) (citation [1]: NICODEMUS, FRED E. "Directional reflectance and emissivity of an opaque surface". Applied Optics volume 4, issue 7, 1965, pages 767-773). For each possible angle of incidence of light, the BRDF specifies the amount of reflected light in each possible observation direction, which is to say it is a four-dimensional function (two parameters for the direction of light incidence and two parameters for the observation direction). For general surfaces, the reflectance behavior also changes over the surface and is therefore also different for each surface point. This is referred to as an SVBRDF ("spatially varying" BRDF) with six parameters (two additional parameters for the identification of the respective point on the surface).

Thus, to measure the SVBRDF, a surface must be illuminated from different illumination directions and be observed from different directions in turn (or be recorded from different recording directions). Disadvantageously, the reflectance behavior of reflective materials, for example, can change significantly even for the smallest changes in angle, with the result that the parameter space has to be sampled densely for a measurement and hence an extremely large number of light positions and observation directions are required. In order nevertheless to be able to measure an SVBRDF by way of a manageable small number of measurements, in the past use has in practice mainly been made of two concepts:

1) Dichroic separation assumes that the reflectance behavior of the entire surface consists in part of a "diffusely reflecting" term and in part of a "specularly reflecting" term. Significant changes over the surface are allowed for the diffusely reflecting term, since it can also be determined from a few angle configurations. By contrast, the specularly reflecting term is divided over the entire surface, which is to say it is either constant or only minor changes are assumed (citation [2]: GEORGHIDIADES, ATHINODOROS S., "Recovering 3-D shape and reflectance from a small number of photographs". Proceedings of the 14th Eurographics workshop on Rendering. Eurographics Association, 2003, pages 230-240; citation [3]: YU, YIZHOU et al. "Inverse global illumination: Recovering reflectance models of real scenes from photographs". Proceedings of the $26^{th}$ annual conference on Computer graphics and interactive techniques, ACM Press/Addison-Wesley-Publishing Co. 1999, pages 215-224).

However, this method cannot be used to describe surfaces with strongly changing specularly reflecting behavior, which is generally very limiting.

2) The vast majority of methods assume that a surface consists of only a very small number of basic or base materials (citation [4]: LENSCH, HENDRIK et al. "Image-based reconstruction of spatial appearance and geometric detail". ACM Transactions and Graphis (TOG) volume 22, issue 2, 2003, pages 234-257; citation [5]: GOLDMANN, DAN B et al. "Shape and spatially-varying brdfs from photometric stereo". Pattern Analysis and Machine Intelligence, IEEE Transactions on, volume 32, issue 6, 2010, pages 1060-1071; citation [6]: HOLROYD, MICHAEL, LAWRENCE, JASON, and ZICKLER, TODD "A coaxial optical scanner for synchronous acquisition of 3D geometry and surface reflectance". ACM Transactions on Graphics (TOG), volume 29, issue 4, 2010, page 99; citation [7]: Giljoo Nam, Joo Ho Lee, Diego Gutierrez, and Min H. Kim "Practical SVBRDF acquisition of 3D objects with unstructured flash photography" ACM Trans. Graph. volume 37, issue 6, Article 267, December 2018.

Citation [8]: NIELSEN, JANNIK BOLL "On Practical Sampling of Bidirectional Reflectance". PhD Thesis, 1 Jan. 2016 (2016-01-01), XP055885310. has likewise already disclosed a method for determining the reflectance behavior of an object, in which a plurality of images of the object are provided, from which the reflectance value is derived and tabulated. In the process, missing entries in the data sets are supplemented—on the basis of entries of already created data sets.

TUNWATTANAPONG, BOROM et al. "Acquiring reflectance and shape from continuous spherical harmonic illumination" ACM Transactions on Graphics, vol. 32, no. 4, Jul. 21, 2013, pages 1-12, DOI: 10.1145/2461912.2461944 discloses a device for detecting the spatially varying reflection properties of 3D objects. Here, the 3D objects are observed under continuous spherical-harmonic illumination conditions. The illumination setup used consists of a rotating arc with controllable LEDs. A full 3-D model and a set of composite reflectance maps is created in the process.

US 2014/0268160 A1 discloses a device for measuring surface orientation maps of an object. In this case, the object is illuminated by a light source with a controllable illumination field while images of the object are recorded by cameras. The reflection properties of the object are then extracted from these images, including an albedo, a reflection vector, a roughness, and/or anisotropy parameters of a specular reflection lobe.

AUDET, SAMUEL et al. "A user-friendly method to geometrically calibrate projector-camera systems" COMPUTER VISION AND PATTERN RECOGNITION WORKSHOPS, 2009. CVPR WORKSHOPS 2009. IEEE COMPUTER SOCIETY CONFERENCE ON IEEE, PISCATAWAY, NJ, USA, Jun. 20, 2009, pages 47-54, ISBN: 978-1-4244-3994-2 discloses a calibration method for a projector-camera system using both a printed pattern and a projection pattern. To simplify the calibration process, these markers are used simultaneously and are overlaid.

WEINMANN, MICHAEL et al. "Advances in geometry and reflectance acquisition (course notes)," 20151102; 1077952576-1077952576, Nov. 2, 2015, pages 1-71, DOI: 10.1145/2818143.2818165 and US 2016/275720 A1 disclose various calibration methods, including using reflective spheres.

WEYRICH, TIM et al. "Principles of appearance acquisition and representation," SIGGRAPH 2008 Class Notes, 1077952576-1077952576, Aug. 11, 2008, pages 1-119, XP058345154, DOI: 10.1145/1401132.1401234 already teaches the additional use of a color chart for the color calibration of a camera in addition to the calibration using reflecting spheres.

A behavior measured at one point can therefore be transferred to another point on the surface if both points are assigned to the same base material. This significantly reduces the number of images required for the SVBRDF measurement. The base materials are usually assigned on the basis of the color of the surface, which is to say the assumption is made that two points with a similar color have the same base material. The main difficulty in these methods lies in recognizing the correct number of base materials and their specific extents, and in making the appropriate mapping from surface point to base material. Each base material and its associated extent can be referred to as a segment of the surface, with the result that this approach can also be referred to as a segmentation problem, in which the different segments of the surface should be determined and, for the determined segments, as few images as possible should be recorded for the SVBRDF measurement.

SUMMARY

Using this and, in particular, the method of the mentioned citation [8], which is considered to be the closest prior art, as a starting point, it is the object of the disclosure to develop a computer-implemented method for determining the reflectance behavior of a surface of an object so that an improved determination is rendered possible. Further, the intention is to provide a computer program, a data processing system and a device for determining the reflectance behavior of a surface of an object, and a storage medium with instructions stored thereon for determining the reflectance behavior of a surface of an object.

In the computer-implemented method for determining the reflectance behavior of a surface of an object, a plurality of images of the object are provided, with the images differing in terms of a recording direction and/or in terms of an illumination direction during the recording. Data sets with entries are created, which each describe a reflectance value derived from the images and an assigned recording direction and an assigned illumination direction, with each data set being assigned to a point on the surface of the object. Further, missing entries for data sets for points on the surface are determined on the basis of entries from already created data sets. Determining the missing entries can comprise a calculation, a combination and/or other steps to be carried out. According to the disclosure, a measure of similarity to the reflectance values derived from the images can be taken into account when determining missing entries in the data sets. Alternatively or in addition, a mean value calculation or a weighted mean value calculation for the reflectance values derived from the images can be performed when determining missing entries in the data sets. In a further alternative or as a further addition, a smoothing of the reflectance values derived from the images can be performed when determining missing entries in the data sets.

Thus, data sets in which the reflectance values are derived from the images can initially already be created from relatively few images. Consequently, these are measured reflectance values in this case. The determined missing entries in the data sets are then based on the data sets already created (or their entries), and are therefore not measured reflectance values but for example calculated entries of the data sets.

This advantageously leads to even a few images being sufficient to achieve a very good determination of the reflectance behavior of the surface of the object. Moreover, the complex and error-prone segmentation as in the previously known procedure is not required, with the result that a very good determination of the reflectance behavior of the surface of the object can also be achieved. For example, this allows the reflectance values to be determined for surface points which were possibly not recorded or not illuminated in a specific configuration and which are therefore not present in the recordings. The step of adjusting missing entries in the data sets is therefore preferably carried out without a segmentation step.

Reflectance is understood here in particular as the reflectivity and hence the ratio of the reflected radiant power to the incident radiant power. In this case, a reflectance value is understood in particular to be a value describing the reflectance. In this case, a reflectance behavior is understood in particular to be how the light is reflected and/or scattered by the surface of the object. In other words, the reflectance behavior describes the optical impression that a person observing the surface gains as a result of reflecting, scattering and/or absorbing properties of the surface.

In this case, the illumination direction is understood in particular to be the angle of incidence (relative to a predetermined coordinate system) at which the surface of the object is illuminated with light during the recording. In this case, the recording direction (relative to the predetermined coordinate system) is understood in particular to be the angle at which the surface of the object is recorded.

When determining missing entries in the data sets for points on the surface of the object (which is also referred to hereinafter as determining further data sets for points on the surface of the object) on the basis of entries in already created data sets, a measure of similarity to the reflectance values derived from the images can be taken into account. At least one measure selected from the group of similarity of the angular configuration, spatial distance, and photometric similarity can be taken into account in the measure of similarity.

The similarity of the angular configuration can in particular be the deviation in the angle of the recording direction and/or the deviation in the angle of the illumination direction. The spatial distance can in particular be the distance over the surface (geodetic distance). The photometric similarity can in particular be the similarity of the reflectance values derived from the images. The smaller the respective difference, the more likely the similarity is assumed.

Further, a mean value calculation or a weighted mean value calculation for the reflectance values derived from the images on the basis of entries in already created data sets can be performed when determining missing entries in the data sets for points on the surface of the object.

The mean value calculation can in particular be the calculation of the arithmetic mean. A further parameter can be taken into account in the weighted mean value calculation, for example the distance from the point on the surface for which the further data set should be calculated. The greater the distance, the less influence an already known reflectance value may have.

Incorrect values can be better avoided by calculating the mean value since individual incorrect reflectance values are taken into account less.

Further, the reflectance values derived from the images can be smoothed. In particular, this is understood to mean that the measured values are averaged in order thus to be able to better correct undesired outliers. The derived reflectance values can also be said to be subjected to low-pass filtering for smoothing purposes.

The step of providing the plurality of images of the object can comprise the step of illuminating and recording. In this case, the images may contain a plurality of pixels, which are then assigned to corresponding image points and a combination of recording direction and illumination direction.

In the computer-implemented method according to the disclosure for determining the reflectance behavior of a surface of an object, the data sets can be parameterized in such a way that there is a four-dimensional angular component with two parameters for the illumination direction and two parameters for the recording direction and a two-dimensional spatial component with two parameters for the corresponding point on the surface of the object. A discretization of this function is achieved by the data sets.

Furthermore, a continuously spatially varying bidirectional reflectance distribution function can be calculated on the basis of the data sets. In particular, this is understood to mean that the function is continuous. Photo-realistic representations of the object, in particular, can be created in this way.

Using the method according to the disclosure (including its development), it is possible to determine the reflectance behavior of the surface of the object by means of the data sets.

The object can be a spectacle lens, a spectacle frame or a pair of spectacles, in particular.

In the computer-implemented method according to the disclosure, at least one of the sequences of steps a) or b) can be carried out for the calibration. In the sequence of steps a), at least one first calibration recording of a calibration object with a plurality of distinguishable markers at positions which are known relative to one another is evaluated, at least one second calibration recording of the calibration object, which was illuminated with a pattern during recording, is evaluated and the calibration is then performed on the basis of the evaluations of the first and second calibration recording(s). In the sequence of steps b), at least one first calibration recording of a calibration object with a plurality of distinguishable spheres at positions which are known relative to one another is evaluated, with the centers of the spheres being determined, and the calibration is performed on the basis of the evaluation(s) of the first calibration recording(s). Such a calibration renders possible an improved determination of the reflectance behavior of the surface of the object Alternatively or in addition, at least a fourth calibration recording of a calibration object can be evaluated for a calibration in the computer-implemented method. This calibration object has a non-repetitive pattern, whereby characteristic features of the surface of the calibration object are specified, a variable size, a plurality of calibration bodies of different sizes, a color chart for the color calibration of cameras for generating the recordings, or characteristic features with known scaling and/or known relative distances from one another.

Alternatively or in addition, for a calibration of at least one camera-projector combination, a calibration object can further be recorded using at least one camera of the at least one camera-projector combination(s) in a step III) within the computer-implemented method. In a step IV), at least one of the projectors of the camera-projector combination(s) projects one or more patterns onto the calibration object and these patterns are recorded by the at least one camera of the camera-projector combination(s). In a step V) a calibration of the at least one camera of the camera-projector combination(s) and/or of the at least one projector of the camera-projector combination(s) is performed on the basis of the recordings of the at least one camera of the camera-projector combination(s). Here, provision is made for the relative positioning of the calibration object with respect to the at least one camera of the camera-projector combination to be changed after carrying out the sequence of steps III) and IV) and for the sequence of steps III) and IV) to then be carried out again. As an alternative or in addition, the calibration of a camera response curve of the at least one camera of the camera-projector combination(s) can be performed on the basis of recordings with different exposure times.

In the computer-implemented method, a bidirectional reflectance distribution function which describes the quantity of reflected light of a reflected ray in each possible observation direction as a BRDF value for each point on the surface of the object and for possible angles of incidence of light of an incident ray, can be provided for the purpose of creating the data sets, with the result that the reflectance distribution function is a six-dimensional function that contains a four-dimensional angular component with two parameters for the direction of light incidence and two parameters for the observation direction, and a two-dimensional spatial component with two parameters for the corresponding point on the surface of the object.

This parameterization enables a good description of the reflectance behavior of the surface of the object.

In the computer-implemented method, it is furthermore possible in the case of a bidirectional reflectance distribution function (BRDF), which describes the quantity of reflected light of a reflected ray in each possible observation direction as a BRDF value for each point on the surface of the object and for possible angles of incidence of light of an incident ray, with the result that the reflectance distribution function (SVBRDF) is a six-dimensional function that contains a four-dimensional angular component with two parameters for the direction of light incidence and two parameters for the observation direction, and a two-dimensional spatial component with two parameters for the corresponding point on the object surface, for the four-dimensional angular component of the reflectance distribution function to be parametrized using a Rusinkiewicz parameterization such that a polar angle and an azimuth angle of a halfway vector and a polar angle and an azimuth angle of a difference vector are available as the transformed coordinate axes, where the halfway vector is the halfway vector between the incident ray and the reflected ray and the difference vector is the difference between the incident ray and the halfway vector. Then, a discretization of the space spanned by the transformed coordinate axes is performed using a coordinate grid structure with grid points, with the grid spacing for the polar angle coordinate axis of the halfway vector being less than the grid spacing for the remaining transformed coordinate axes. Further, a reflectance measurement is performed for each grid point on the surface of the object for the purpose of measuring the BRDF value. A BRDF table is constructed for each grid point using the measured BRDF values from the data sets, and the BRDF tables for unmeasured points on the surface are completed by calculating the BRDF values of the unmeasured points on the surface from the measured BRDF values, in order thus to describe the reflectance behavior of the surface of the object. This means that even surfaces with strongly varying reflectance behavior can be measured and the reflectance behavior of the surface can be described, with the frequently erroneous segmentation being able to be dispensed with entirely. It is therefore not necessary to recognize a number of base materials or determine this in any way. A corresponding assignment of a surface point to a specific base material is also dispensed with. In particular, this is achieved by the step of calculating the BRDF values of the unmeasured points on the surface.

A computer program is also provided for determining the reflectance behavior of a surface of an object on the basis of a plurality of provided images of the object, which differ in terms of a recording direction and/or illumination direction of the recording, wherein the computer program comprises instructions which, when executed on a computer, prompt the computer to create data sets with entries which each describe a reflectance value derived from the images and an assigned recording direction and an assigned illumination direction, with each data set being assigned to a point on the surface of the object. Further, the instructions prompt the computer to determine missing entries in the data sets for points on the surface of the object on the basis of entries of already created data sets. Determining the missing entries can comprise a calculation, a combination and/or other steps to be carried out. According to the disclosure, a measure of similarity to the reflectance values derived from the images can be taken into account when determining missing entries in the data sets. Alternatively or in addition, a mean value calculation or a weighted mean value calculation for the reflectance values derived from the images can be performed when determining missing entries in the data sets. In a further alternative or as a further addition, a smoothing of the reflectance values derived from the images can be performed when determining missing entries in the data sets.

Hence, advantageously, a very good determination of the reflectance behavior of a surface of the object can be obtained in this way using only a few images.

A non-volatile computer-readable storage medium with instructions stored thereon for determining the reflectance behavior of a surface of an object on the basis of a plurality of provided images of the object, which differ in terms of a recording direction and/or illumination direction during the recording, is also provided, wherein the instructions, when executed on a computer, prompt the computer to create data sets with entries which each describe a reflectance value derived from the images and an assigned recording direction and an assigned illumination direction, with each data set being assigned to a point on the surface of the object. Further, the instructions prompt the computer to determine missing entries in the data sets for points on the surface of the object on the basis of entries of already created data sets. Determining the missing entries can comprise a calculation, a combination and/or other steps to be carried out. According to the disclosure, a measure of similarity to the reflectance values derived from the images can be taken into account when determining missing entries in the data sets. Alternatively or in addition, a mean value calculation or a weighted mean value calculation for the reflectance values derived from the images can be performed when determining missing entries in the data sets. In a further alternative or as a further addition, a smoothing of the reflectance values derived from the images can be performed when determining missing entries in the data sets.

Hence, advantageously, a very good determination of the reflectance behavior of the surface of the object can already be obtained by using only a few images.

Further, a data processing system for determining the reflectance behavior of a surface of an object on the basis of a plurality of provided images of the object, which differ in terms of a recording direction and/or illumination direction during the recording, is provided, wherein the data processing system comprises a processor and a memory. On the basis of instructions of a computer program stored in the memory, the processor is designed to create data sets with entries, which each describe a reflectance value derived from the images and an assigned recording direction and an assigned illumination direction, with each data set being assigned to a point on the surface of the object. Further, the process is designed, on the basis of the instructions of the computer program stored in the memory, to determine missing entries in the data sets for points on the surface of the object on the basis of entries of already created data sets. Determining the missing entries can comprise a calculation, a combination and/or other steps to be carried out. According to the disclosure, a measure of similarity to the reflectance values derived from the images can be taken into account when determining missing entries in the data sets. Alternatively or in addition, a mean value calculation or a weighted mean value calculation for the reflectance values derived from the images can be performed when determining missing entries in the data sets. In a further alternative or as a further addition, a smoothing of the reflectance values derived from the images can be performed when determining missing entries in the data sets.

Hence, advantageously, a very good determination of the reflectance behavior of the surface of the object can already be obtained by using only a few images.

Further, a device for determining the reflectance behavior of a surface of an object is provided, wherein the device comprises a control unit and a detection unit, wherein the detection unit is configured to record a plurality of images of the object, which differ in terms of a recording direction and/or an illumination direction during the recording, and wherein the control unit is configured to create data sets with entries which each describe a reflectance value derived from the images and an assigned recording direction and an assigned illumination direction, with each data set being assigned to a point on the surface of the object and missing entries in the data sets for points of the object being determined on the basis of entries of already created data sets. The reflectance behavior of the surface of an object can be determined by means of the data sets created in this way. To this end, the control unit is configured to take into account a measure of similarity to the reflectance values derived from the images. Alternatively or in addition, the control unit is further configured to perform a mean value calculation or a weighted mean value calculation for the reflectance values derived from the images. In a further alternative or as a further addition, the control unit is further configured to perform a smoothing of the reflectance values derived from the images.

Even surfaces with strongly varying reflectance behavior can be measured and the reflectance behavior of the surface can be described by means of the method according to the disclosure, with the frequently erroneous segmentation being able to be dispensed with entirely. In concrete terms, it is not necessary to recognize a number of base materials or determine these in any way. A corresponding assignment of a surface point to a specific base material is also dispensed with. In particular, this is achieved by the step of calculating further data sets.

Further, a method for determining the reflectance behavior of a surface of an object is provided, including the following steps of:
providing a bidirectional reflectance distribution function (BRDF) which describes the quantity of reflected light of a reflected ray in each possible observation direction as a BRDF value for each point on the surface of the object and for possible angles of incidence of light of an incident ray, with the result that the reflectance distribution function (SVBRDF) is a six-dimensional function that contains a four-dimensional angular component with two parameters for the direction of light incidence and two parameters for the observation direction, and a two-dimensional spatial component with two parameters for the corresponding point on the object surface. The following steps are also carried out:
parameterizing the four-dimensional angular component of the reflectance distribution function (SVBRDF) using a Rusinkiewicz parameterization such that a polar angle ($\Theta_h$) and an azimuth angle ($\Phi_h$) of a halfway vector ($\vec{h}$) and a polar angle ($\Theta_d$) and an azimuth angle ($\Phi_d$) of a difference vector ($\vec{d}$) are available as the transformed coordinate axes, where the halfway vector ($\vec{h}$) is the halfway vector between the incident ray and the reflected ray and the difference vector ($\vec{d}$) is the difference between the incident ray and the halfway vector ($\vec{h}$),
discretizing the space spanned by the transformed coordinate axes using a coordinate grid structure with grid points, with the grid spacing for the polar angle ($\Theta_h$) coordinate axis of the halfway vector ($\vec{h}$) being able to be less than the grid spacing for the remaining transformed coordinate axes ($\Phi_h$, $\Theta_d$, $\Phi_d$),
performing a reflectance measurement for each grid point at a predetermined number of points on the surface of the object for the purpose of measuring the BRDF value, wherein the predetermined number of points on the surface is less than the total number of points for describing the surface of the object and can be different at the different grid points, creating a BRDF table for each grid point with the measured BRDF values and completing the BRDF tables for the unmeasured points on the surface by determining (e.g., calculating) the BRDF values of the unmeasured points on the surface from the measured BRDF values in order to describe the reflectance behavior of the surface of the object in this way.

In particular, the data sets can be combined to form the BRDF tables.

A measure of similarity to the measured points can be taken into account when calculating the BRDF values of the unmeasured points on the surface from the measured BRDF values.

At least one measure selected from the group of similarity of the angular configuration, spatial distance (e.g., over the surface), and photometric similarity can be taken into account as the measure of similarity.

The similarity in particular increases as the distance decreases in the case of the similarity of the angular configuration; the similarity in particular increases the shorter the distance is in the case of the spatial distance; and the similarity in particular increases as the distance reduces in the case of the photometric similarity.

A mean value calculation or weighted mean value calculation can be performed when calculating the BRDF values of the unmeasured points on the surface from the measured BRDF values.

Further, the measured BRDF values can be smoothed when creating the BRDF tables for each grid point using the measured BRDF values.

Furthermore, a continuous bidirectional reflectance distribution function can be calculated on the basis of the completed BRDF tables.

To calculate the continuous bidirectional reflectance distribution function, a multivariate interpolation (i.e., an interpolation for a function with a plurality of variables) or a parameter estimation of the parameterized reflectance distribution function can be performed.

Further, a device for determining the reflectance behavior of a surface of an object is provided, wherein the device comprises a control unit and a detection unit, wherein the control unit provides a bidirectional reflectance distribution function (BRDF) which describes the quantity of reflected light of a reflected ray in each possible observation direction as a BRDF value for each point on the surface of the object to be measured and for possible angles of incidence of light of an incident ray, with the result that the reflectance distribution function (SVBRDF) is a six-dimensional function that contains a four-dimensional angular component with two parameters for the direction of light incidence and two parameters for the observation direction, and a two-dimensional spatial component with two parameters for the corresponding point on the object surface,
wherein the control unit parameterizes the four-dimensional angular component of the reflectance distribution function (SVBRDF) using a Rusinkiewicz parameterization in such a way that a polar angle ($\Theta_h$) and an azimuth angle ($\Phi_h$) of a halfway vector ($\vec{h}$) and a polar angle ($\Theta_d$) and an azimuth angle ($\Phi_d$) of a difference vector ($\vec{d}$) are available as the transformed coordinate axes, where the halfway vector ($\vec{h}$) is the halfway vector between the incident ray and the reflected ray and the difference vector ($\vec{d}$) is the difference between the incident ray and the halfway vector ($\vec{h}$),
and discretizes the space spanned by the transformed coordinate axes using a coordinate grid structure with grid points, with the grid spacing for the polar angle ($\Theta_h$) coordinate axis of the halfway vector ($\vec{h}$) being less than the grid spacing for the remaining transformed coordinate axes ($\Phi_h$, $\Theta_d$, $\Phi_d$),
wherein the detection unit performs a reflectance measurement for each grid point at a predetermined number of points on the surface of the object to be measured for the purpose of measuring the BRDF value, wherein the predetermined number of points on the surface is less than the total number of points for describing the surface of the object to be measured and can be different at the different grid points, wherein the control unit creates a BRDF table for each grid point with the measured BRDF values and completes the BRDF tables for the unmeasured points on the surface by determining (e.g., calculating) the BRDF values of the unmeasured points on the surface from the measured BRDF values in order to describe the reflectance behavior of the surface of the object to be measured in this way.

It goes without saying that the features mentioned above and the features yet to be explained hereinafter can be used not only in the specified combinations but also in other combinations or on their own without departing from the scope of the present disclosure.

The device according to the disclosure can be developed in the same way as the method according to the disclosure (this also applies vice versa).

The disclosure is explained in more detail hereinafter on the basis of exemplary clauses with reference to the accompanying drawings, which also disclose features that are essential to the disclosure. These exemplary clauses are provided for illustration only and should not be construed as limiting. For example, a description of an exemplary clause having a multiplicity of elements or components should not be construed as meaning that all of these elements or components are necessary for implementation. Rather, other exemplary clauses may also contain alternative elements and components, fewer elements or components, or additional elements or components. Elements or components of different exemplary clauses can be combined with one another, unless indicated otherwise. Modifications and variations that are described for one of the exemplary clauses can also be applicable to other exemplary clauses. In order to avoid repetition, elements that are the same or correspond to one another in different figures are denoted by the same reference signs and are not explained repeatedly. In the figures:

DESCRIPTION OF EXEMPLARY EMBODIMENTS

Figure 1:
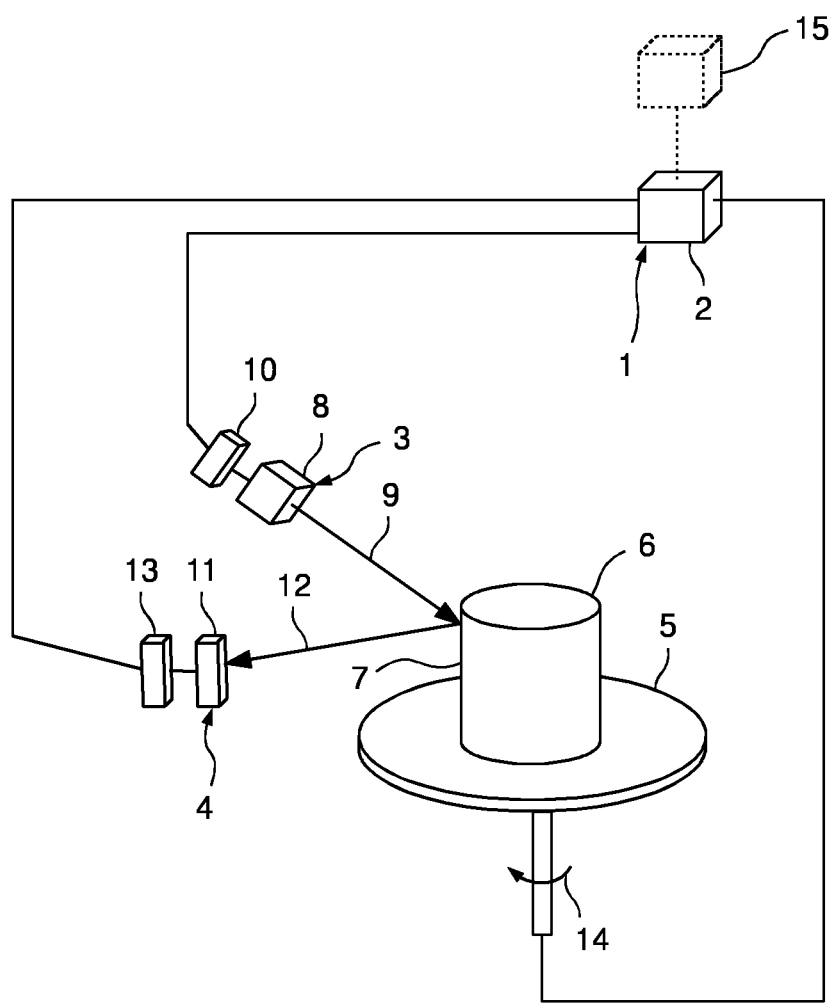
FIG. 1 shows a schematic view of a clause of the device according to the disclosure.

The exemplary clause of a 3-D digitizing system 1 (which can also be referred to as a measuring system 1 or as a device 1 for determining the reflectance behavior of a surface of an object) shown in FIG. 1 comprises a control unit 2, an illumination unit 3 which is positionable in space, a detection unit 4 which is positionable in space, and a holder 5 on which an object 6 to be digitized is positioned. The holder 5 can be in the form of a rotatable glass plate, for example.

In particular, the 3-D digitizing system 1 is embodied in such a way that a description of the reflectance behavior of the surface 7 of the object 6 can be determined therewith.

The illumination unit 3 has a light source 8, which can direct a light ray 9 (incident ray) onto the surface 7 of the object 6, and a first movement unit 10, which can set and change the position of the light source 8 in space (and hence can set and change the direction of the light ray 9 and the point of incidence of the light ray 9 on the surface 7). The detection unit 4 comprises a detector 11 for detecting the light ray 12 reflected by the surface 7, and a second movement unit 13 with which the position of the detector 11 in space can be set and changed. The holder 5 is rotatable, as indicated by the arrow 14. Hence, the surface 7 of the object 6 can be illuminated at different points with different angles and the reflection or scattering at different angles can be detected.

The control unit 2 can implement all the calculation and evaluation steps described hereinafter. However, it is also possible that the control unit 2 only controls the measurement steps described hereinafter and transmits the data obtained thereby to a separate calculation unit 15, as indicated by dashed lines in FIG. 1, and that the calculation unit 15 carries out the calculation and evaluation steps. The calculation unit 15 can be a computer with a processor; the same applies to the control unit 2.

For opaque surfaces 7 in particular, this interaction or reflectance behavior can be described mathematically using a bidirectional reflectance distribution function (BRDF) (citation [1]). For every possible angle of incidence of light, the BRDF specifies the amount of reflected light (BRDF value) in every possible observation direction. It is therefore fundamentally a four-dimensional function with two parameters for the direction of light incidence and two parameters for the observation direction. Since this is generally not constant for surfaces 7 but may also additionally differ from the location on the surface 7 (i.e., from the surface point), the BRDF has two additional parameters for identifying the respective location on the surface 7, with the result that the bidirectional reflectance distribution function is a six-dimensional function, which has a four-dimensional angular component with two parameters for the direction of light incidence and two parameters for the observation direction, and a two-dimensional spatial component with two parameters for the corresponding points on the object surface. In this case, the bidirectional reflectance distribution function can also be referred to as a spatially varying bidirectional reflectance distribution function (e.g., spatially varying BRDF or SVBDF).

In order to be able to describe the reflectance behavior of the surface 7 of the object 6 well, even if the surface 7 has a locally strongly varying reflectance behavior, the four-dimensional angular component is parameterized in the six-dimensional bidirectional reflectance distribution function by means of the Rusinkiewicz parameterization such that polar angle $\theta_h$ and azimuth angle $\Phi_h$ of a halfway vector h and polar angle $\theta_d$ and azimuth angle $\Phi_d$ of a difference vector d are available as transformed coordinate axes. The halfway vector h is the halfway vector between incident ray 9 and reflected ray 12 and the difference vector d is the difference between the incident ray 9 and the halfway vector h (the halfway vector h and the difference vector d are each specified here in bold and can also be specified as $\vec{h}$ and $\vec{d}$). The Rusinkiewicz parameterization is described in detail in the article "A New Change of Variables for Efficient BRDF Representation" Szymon M. Rusinkiewicz, Stanford University, which can be downloaded from, e.g., the url www.cs.princeton.edu/~smr/papers/brdf_change_of_variables/ and which was presented at the 1998 Eurographics Workshop on Rendering.

Figure 2:
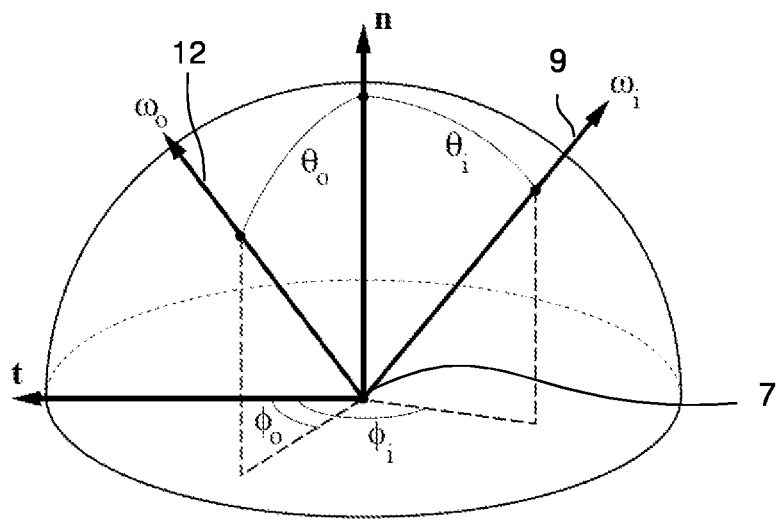
FIG. 2 shows a schematic representation for explaining the spherical coordinates for the incident ray 9 and the reflected ray 12.
Figure 3:
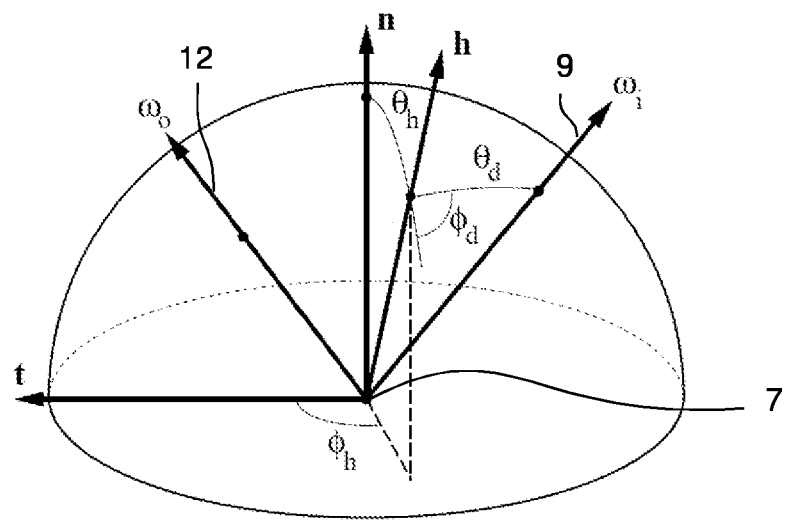
FIG. 3 shows a representation in accordance with FIG. 2 for the purpose of explaining the performed Rusinkiewicz parameterization.

Using a reflection, shown schematically in FIG. 2, of the incident light ray 9 (which runs in the opposite direction to the arrow shown) at a point on the surface 7, which leads to a reflected light ray 12 and is depicted in FIG. 2 in spherical coordinates, as a starting point, this parameterization is explained in conjunction with FIG. 3 since FIG. 3 depicts the same reflection in the Rusinkiewicz parameterization.

In FIG. 2, the incident light ray 9 is uniquely described in relation to the surface normal n and the surface tangent t using spherical coordinates $\theta_i$ and $\Phi_i$. The reflected light ray 12 has angles $\theta_o$ and $\Phi_o$.

According to the Rusinkiewicz parameterization, this reflection is described by the transformed coordinate axes $\theta_h$, $\Phi_h$, $\theta_d$, $\Phi_d$. Further details emerge from the description of the vectors hereinafter.

$$n = \vec{n} = \text{Surface normal}$$

$$t = \vec{t} = \text{Surface tangent}$$

$$b = \vec{b} = \text{Surface binormal } (i.e., n \times t)$$

$$\omega_i = \vec{\omega}_i = \text{Spherical coordinates } \Theta_i \text{ and } \Phi_i$$

$$\omega_o = \vec{\omega}_o = \text{Spherical coordinates } \Theta_o \text{ and } \Phi_o$$

$$h = \vec{h} = \frac{\vec{\omega}_i + \vec{\omega}_o}{\|\vec{\omega}_i + \vec{\omega}_o\|} = \text{Spherical coordinates } \Theta_h \text{ and } \Phi_h$$

$$d = \vec{d} = rot_{\vec{b},-\Theta_h} rot_{\vec{n},-\Phi_h} \vec{\omega}_i = \text{Spherical coordinates } \Theta_d \text{ and } \Phi_d$$

$\Theta_h$ and $\Phi_h$ are the spherical coordinates of the halfway vector h in the t-n-b system and the two rotations for d bring the halfway vector h to the North Pole and are the spherical coordinates $\Theta_i$ and $\Phi_i$ of the incident ray 9 in this transformed system (further details can be found in citation [1] and in the aforementioned article, "A New Change of Variables for Efficient BRDF Representation," by Rusinkiewicz).

According to the disclosure, it was established that the BRDF values of many materials occurring in practice exhibit a significant change in the $\theta_h$-direction and a smaller change along the remaining coordinate axes $\theta_d$, $\Phi_h$ and $\Phi_d$. Therefore, the space spanned by the Rusinkiewicz parameterization is discretized using a grid structure, where the grid spacing chosen is smaller along the $\theta_h$-direction than in the case of the directions of the other coordinate axes, since larger changes in the reflectance behavior are expected along the $\theta_h$-direction. The result is an "angle table" which contains a number of angle configurations of direction of light incidence and observation direction that are important for the reflectance behavior. In this case, the number of entries is regulated by the fineness of the discretization of the space. As shown in the exemplary angle table hereinafter, the angle $\theta_h$ varies in 10° steps, and so nine intervals are present. No subdivision is performed for the angles $\Phi_h$, $\theta_d$ and $\Phi_d$, and so there is a single interval in each case. This results in an angle table with 9·1·1·1=9 entries, as shown below.

| Angle table: | | | | |
|---|---|---|---|---|
| Index | $\Theta_h$ | $\Phi_h$ | $\Theta_d$ | $\Phi_d$ |
| 0 | [0°-10°[ | [0°-180°] | [0°-90°] | [0°-180°] |
| 1 | [10°-20°[ | [0°-180°] | [0°-90°] | [0°-180°] |
| 2 | [20°-30°[ | [0°-180°] | [0°-90°] | [0°-180°] |
| 3 | [30°-40°[ | [0°-180°] | [0°-90°] | [0°-180°] |
| 4 | [40°-50°[ | [0°-180°] | [0°-90°] | [0°-180°] |
| 5 | [50°-60°[ | [0°-180°] | [0°-90°] | [0°-180°] |
| 6 | [60°-70°[ | [0°-180°] | [0°-90°] | [0°-180°] |
| 7 | [70°-80°[ | [0°-180°] | [0°-90°] | [0°-180°] |
| 8 | [80°-90°] | [0°-180°] | [0°-90°] | [0°-180°] |

The assigned BRDF values of the corresponding surface points are now sought for each of the nine entries in the angle table and are assigned to these entries. This combination of discrete angles (corresponding to the entries from the angle table) with the assigned BRDF values is also referred to as BRDF table hereinafter. A BRDF table is given schematically for the index value 2 according to the angle table, wherein, to simplify the description, 25 points on the surface 7 with the coordinates K1 and K2 are assumed and measured values are only available if no "-" has been entered in the corresponding "value" column.

| Index = 2 (measured) | | |
|---|---|---|
| K1 | K2 | Value |
| 1 | 1 | W11 |
| 1 | 2 | — |
| 1 | 3 | W13 |
| 1 | 4 | — |
| 1 | 5 | — |
| 2 | 1 | — |
| 2 | 2 | W22 |
| 2 | 3 | W23 |
| 2 | 4 | — |
| 2 | 5 | — |
| 3 | 1 | W31 |
| 3 | 2 | — |
| 3 | 3 | — |
| 3 | 4 | — |
| 3 | 5 | — |
| 4 | 1 | — |
| 4 | 2 | W42 |
| 4 | 3 | W43 |
| 4 | 4 | — |
| 4 | 5 | — |
| 5 | 1 | — |
| 5 | 2 | — |
| 5 | 3 | W53 |
| 5 | 4 | — |
| 5 | 5 | W55 |

Since each point on the surface 7 thus provides a BRDF value in one of the BRDF tables, not all BRDF tables will be completely filled in after the measurement, as is shown schematically for the BRDF table with index=2, since in practice only a small number of characteristic angular configurations are measured for each surface point.

Therefore, the unmeasured BRDF values are determined the basis of the measured BRDF values and the BRDF tables are thus completed. In this context, this problem can be treated as a "scattered data interpolation" problem. In this case, a fundamental concept is that unknown (unmeasured) BRDF values are determined for each surface point using other known (measured) BRDF values from the remaining BRDF tables if the assumption can be made that the surface 7 has a similar reaction.

Therefore, a measure of similarity to all other unknown BRDF values of all BRDF tables is determined for each known BRDF value on the basis of the following considerations:
1) Similarity of angular configuration. How large is the distance of the angular configuration from the unknown entry? A small distance indicates a high similarity in this case.
2) Spatial distance is taken into account. Hence, how far away is the unknown entry on surface 7? The shorter the distance, the higher the similarity.
3) Photometric similarity is taken into account. How similar are the respective BRDF tables of the respective entries. A small distance indicates a high similarity.

Unknown BRDF values are thus determined by means of known BRDF values (for example, by a weighted average or other interpolation techniques) which have a high degree of similarity in relation to the previous three considerations. It is likewise possible for measured BRDF values to be corrected in a similar way, for example to perform smoothing. In this way, the unknown BRDF values are filled in and hence the entire SVBRDF is determined without needing to determine a number of base materials.

The BRDF table filled in for index=2 is shown below:

| Index = 2 (completed) | | |
|---|---|---|
| K1 | K2 | Value |
| 1 | 1 | W11 |
| 1 | 2 | W12 |
| 1 | 3 | W13 |
| 1 | 4 | W14 |
| 1 | 5 | W15 |
| 2 | 1 | W21 |
| 2 | 2 | W22 |
| 2 | 3 | W23 |
| 2 | 4 | W24 |
| 2 | 5 | W25 |
| 3 | 1 | W31 |
| 3 | 2 | W32 |
| 3 | 3 | W33 |
| 3 | 4 | W34 |
| 3 | 5 | W35 |
| 4 | 1 | W41 |
| 4 | 2 | W42 |
| 4 | 3 | W43 |
| 4 | 4 | W44 |
| 4 | 5 | W45 |
| 5 | 1 | W51 |
| 5 | 2 | W52 |
| 5 | 3 | W53 |
| 5 | 4 | W54 |
| 5 | 5 | W55 |

Each row of a BRDF table can also be referred to as a data set DS with at least one entry (e.g., reflectance value and an assigned recording direction and an assigned illumination direction), with each data set being assigned to a point on the surface 7 of the object 6.

It is then also possible to determine continuous SVBRDF on the basis of the filled-in BRDF tables. This is possible, for example, by multivariate interpolation or parameter estimation of a parameterized BRDF model.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for determining the reflectance behavior of a surface of an object, the method comprising the steps of:
providing a plurality of images of the object which differ in terms of a recording direction and/or in terms of an illumination direction during the recording;
creating of data sets with entries which each describe a reflectance value derived from the images and an assigned recording direction and an assigned illumination direction, with each data set being assigned to a point on the surface of the object; and
determining missing entries in the data sets on the basis of entries of already created data sets, wherein
a measure of similarity to the reflectance values derived from the images is taken into account when determining missing entries in the data sets.

2. A computer-implemented method for determining the reflectance behavior of a surface of an object, the method comprising the steps of:
providing a plurality of images of the object which differ in terms of a recording direction and/or in terms of an illumination direction during the recording;
creating of data sets with entries which each describe a reflectance value derived from the images and an assigned recording direction and an assigned illumination direction, with each data set being assigned to a point on the surface of the object; and
determining missing entries in the data sets on the basis of entries of already created data sets,
wherein
a mean value calculation or a weighted mean value calculation for the reflectance values derived from the images is performed when determining missing entries in the data sets.

3. A computer-implemented method for determining the reflectance behavior of a surface of an object, the method comprising the steps of:
providing a plurality of images of the object which differ in terms of a recording direction and/or in terms of an illumination direction during the recording;
creating of data sets with entries which each describe a reflectance value derived from the images and an assigned recording direction and an assigned illumination direction, with each data set being assigned to a point on the surface of the object; and
determining missing entries in the data sets on the basis of entries of already created data sets, wherein
a smoothing of the reflectance values derived from the images is performed when determining missing entries in the data sets.

4. The computer-implemented method as claimed in claim 2, wherein a measure of similarity to the reflectance values derived from the images is taken into account when determining missing entries in the data sets,
wherein at least one measure selected from the group of similarity of the angular configuration, spatial distance over the surface and photometric similarity is taken into account as the measure of similarity, and
wherein the similarity increases with decreasing distance for angular configuration similarity, the similarity becomes ever higher with shorter distance for the spatial distance, and the similarity increases with decreasing distance for photometric similarity.

5. The computer-implemented method as claimed in claim 1, wherein a mean value calculation or a weighted mean value calculation for the reflectance values derived from the images is performed when determining missing entries in the data sets.

6. The computer-implemented method as claimed in claim 1, wherein a smoothing of the reflectance values derived from the images is performed when determining missing entries in the data sets.

7. The computer-implemented method as claimed in claim 1, wherein the data sets are parameterized in such a way that there is a four-dimensional angular component with two parameters for the illumination direction and two parameters for the recording direction.

8. The computer-implemented method as claimed in claim 1, wherein the object is at least one object selected from a group comprising a spectacle lens, a spectacle frame, and a pair of spectacles.

9. The computer-implemented method as claimed in claim 1, wherein at least one of the following sequence of steps is carried out for calibration purposes:
a) evaluating at least one first calibration recording of a calibration object with a plurality of distinguishable markers at positions which are known relative to one another, evaluating at least one second calibration recording of the calibration object, which was illuminated with a pattern during recording, and
performing the calibration on the basis of the evaluations of the first and second calibration recording(s); or
b) evaluating at least one third calibration recording of a calibration object with a plurality of distinguishable spheres at positions which are known relative to one another, with the centers of the spheres being determined, and
performing the calibration on the basis of the evaluation(s) of the third calibration recording(s).

10. The computer-implemented method as claimed in claim 1, wherein at least a fourth calibration recording of a calibration object is evaluated for a calibration, with the calibration object having at least one of the following properties:
the calibration object has a non-repetitive pattern, whereby characteristic features of the surface of the calibration object are specified,
the calibration object has a variable size,
the calibration object has a plurality of calibration bodies of different sizes,
the calibration object has a color chart for the color calibration of cameras for generating the recordings, and
the calibration object has characteristic features with known scaling and/or known relative distances from one another.

11. The computer-implemented method as claimed in claim 1, wherein

III) for a calibration of at least one camera-projector combination, a calibration object is recorded using at least one camera of at least one camera-projector combination(s),
IV) at least one of the projectors of the camera-projector combination(s) projects one or more patterns onto the calibration object and these patterns are recorded by the at least one camera of the camera-projector combination(s),
V) wherein a calibration of the at least one camera of the camera-projector combination(s) and/or of the at least one projector of the camera-projector combination(s) is performed on the basis of the recordings of the at least one camera of the camera-projector combination(s),
wherein preferably at least one of the following sequences of steps is carried out: changing the relative positioning of the calibration object with respect to the at least one camera of the camera-projector combination after carrying out the sequence of steps III) and IV) and then carrying out the sequence of steps III) and IV) again, and performing a calibration of a camera response curve of the at least one camera of the camera-projector combination(s) on the basis of recordings with different exposure times.

12. The computer-implemented method as claimed in claim 1, wherein a bidirectional reflectance distribution function (BRDF), which describes the quantity of reflected light of a reflected ray in each possible observation direction as a BRDF value for each point on the surface of the object and for possible angles of incidence of light of an incident ray, is provided for the purpose of creating the data sets, with the result that the reflectance distribution function (BRDF) is a six-dimensional function that contains a four-dimensional angular component with two parameters for the direction of light incidence and two parameters for the observation direction, and a two-dimensional spatial component with two parameters for the corresponding point on the surface of the object.

13. The computer implemented method as claimed in claim 12, further comprising the following steps:
parameterizing the four-dimensional angular component of the reflectance distribution function (SVBRDF) using a Rusinkiewicz parameterization such that a polar angle ($\Theta_h$) and an azimuth angle ($\Phi_h$) of a halfway vector ($\vec{h}$) and a polar angle ($\Theta_d$) and an azimuth angle ($\Phi_d$) of a difference vector ($\vec{d}$) are available as the transformed coordinate axes, where the halfway vector ($\vec{h}$) is the halfway vector between the incident ray and the reflected ray and the difference vector ($\vec{d}$) is the difference between the incident ray and the halfway vector ($\vec{h}$),
discretizing the space spanned by the transformed coordinate axes using a coordinate grid structure with grid points, with the grid spacing for the polar angle ($\Theta_h$) coordinate axis of the halfway vector ($\vec{h}$) being less than the grid spacing for the remaining transformed coordinate axes ($\Phi_h$, $\Theta_d$, $\Phi_d$).

14. A computer program product stored on a non-volatile computer-readable storage medium for determining the reflectance behavior of a surface of an object on the basis of a plurality of provided images of the object, which differ in terms of a recording direction and/or illumination direction during the recording, wherein the computer program comprises instructions which, when executed on a computer, prompt the computer to create data sets with entries which each describe a reflectance value derived from the images and an assigned recording direction and an assigned illumination direction, with each data set being assigned to a point on the surface of the object, and to determine missing entries in the data sets on the basis of entries of already created data sets, wherein a measure of similarity to the reflectance values derived from the images is taken into account, a mean value calculation or a weighted mean value calculation for the reflectance values derived from the images is performed, and/or a smoothing of the reflectance values derived from the images is performed when determining missing entries in the data sets.

15. A data processing system for determining the reflectance behavior of a surface of an object on the basis of a plurality of provided images of the object, which differ in terms of a recording direction and/or illumination direction during the recording, wherein the data processing system comprises:

a processor and a memory, wherein the processor is designed, on the basis of instructions from a computer program stored in memory, to create data sets with entries which each describe a reflectance value derived from the images and an assigned recording direction and an assigned illumination direction, with each data set being assigned to a point on the surface of the object, and to determine missing entries in the data sets on the basis of entries of already created data sets, wherein a measure of similarity to the reflectance values derived from the images is taken into account, a mean value calculation or a weighted mean value calculation for the reflectance values derived from the images, or a smoothing of the reflectance values derived from the images is performed when determining missing entries in the data sets.

16. A non-volatile computer-readable storage medium with instructions stored thereon for determining the reflectance behavior of a surface of an object on the basis of a plurality of provided images of the object, which differ in terms of a recording direction and/or illumination direction during the recording, wherein the instructions, when executed on a computer, prompt the computer to create data sets with entries which each describe a reflectance value derived from the images and an assigned recording direction and an assigned illumination direction, with each data set being assigned to a point on the surface of the object, and to determine missing entries in the data sets on the basis of entries of already created data sets, wherein a measure of similarity to the reflectance values derived from the images is taken into account, a mean value calculation or a weighted mean value calculation for the reflectance values derived from the images is performed, or a smoothing of the reflectance values derived from the images is performed when determining missing entries in the data sets.

17. A device for determining the reflectance behavior of a surface of an object, wherein the device comprises a control unit and a detection unit, wherein the detection unit is configured to record a plurality of images of the object, which differ in terms of a recording direction and/or an illumination direction during the recording, and wherein the control unit is configured to create data sets with entries which each describe a reflectance value derived from the images and an assigned recording direction and an assigned illumination direction, with each data set being assigned to a point on the surface of the object, wherein the control unit is configured to determine missing entries in the data sets on the basis of entries of already created data sets, wherein the control unit for determining the missing entries in the data sets is also configured to take into account a measure of similarity to the reflectance values derived from the images, perform a mean value calculation or a weighted mean value calculation for the reflectance values derived from the images, or perform a smoothing of the reflectance values derived from the images.

* * * * *